July 4, 1939.  M. F. WATERS  2,165,163
PIPE COUPLING
Filed April 25, 1938   3 Sheets-Sheet 1
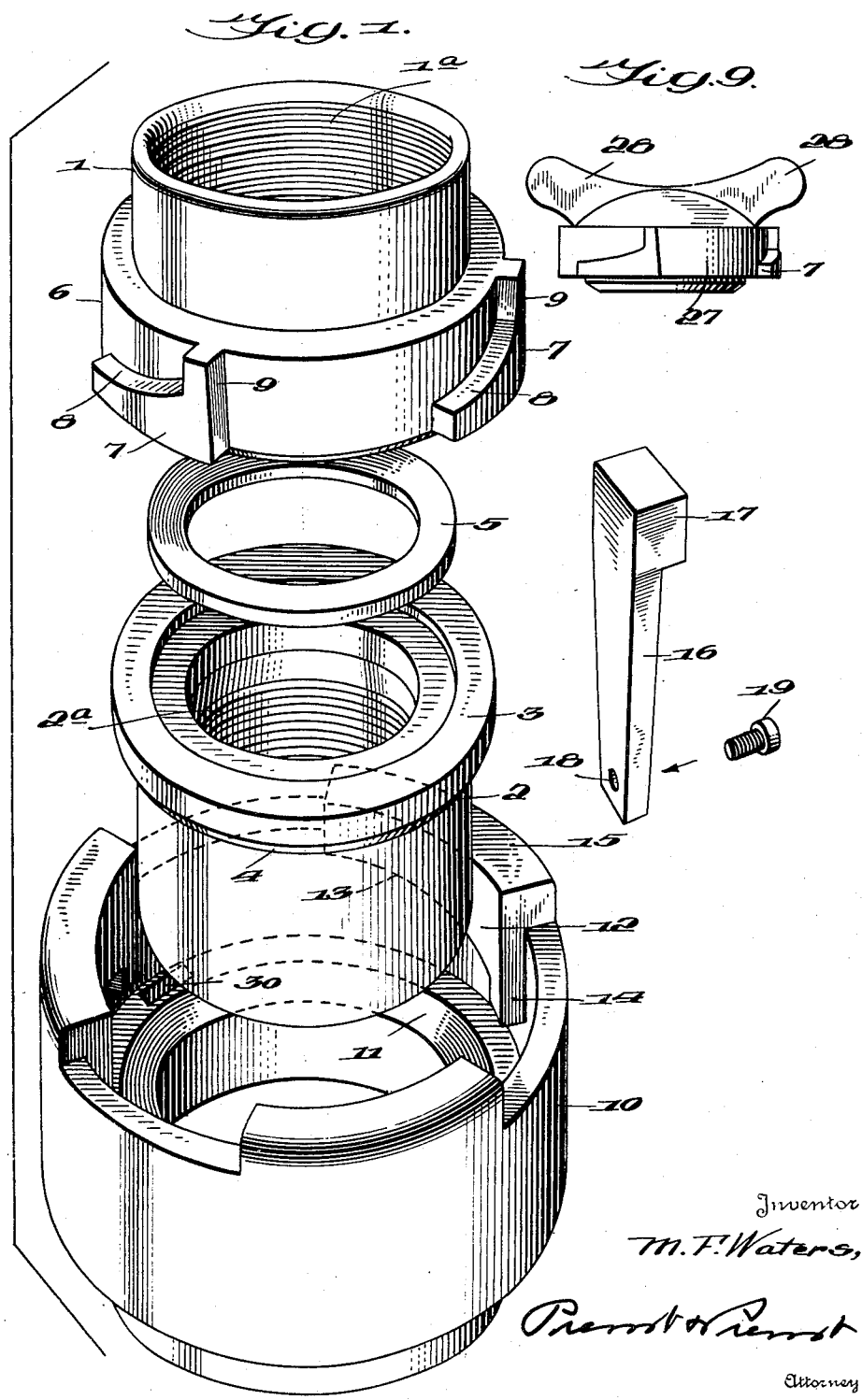

July 4, 1939.  M. F. WATERS  2,165,163
PIPE COUPLING
Filed April 25, 1938  3 Sheets-Sheet 2
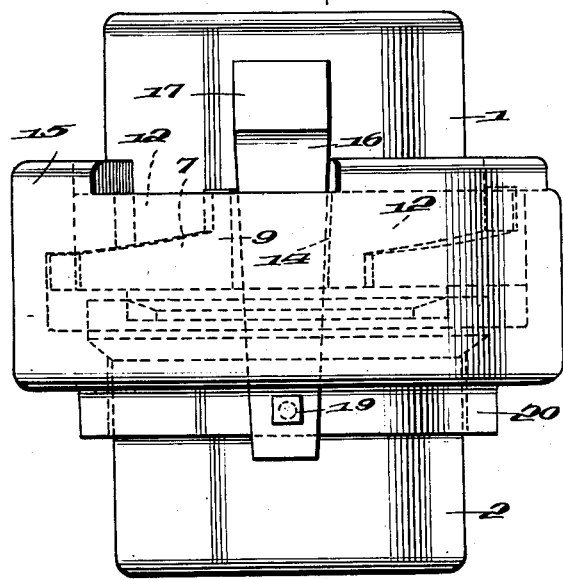
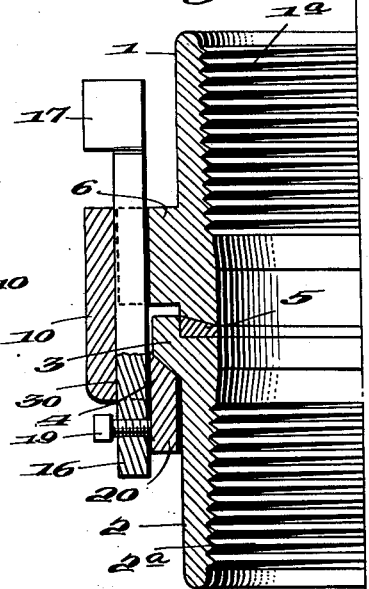
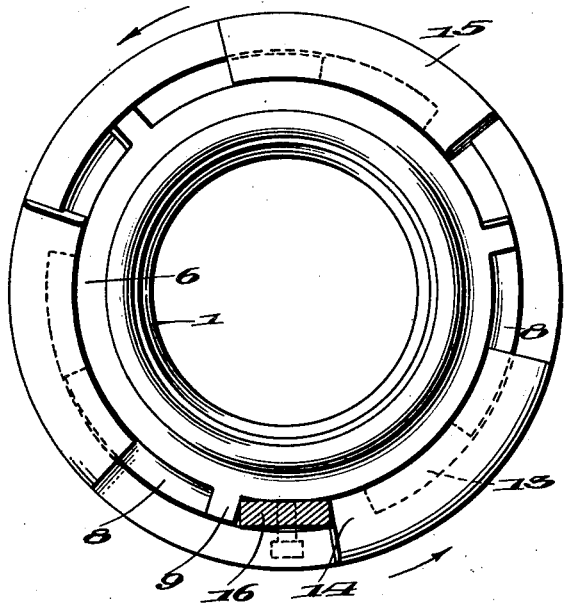
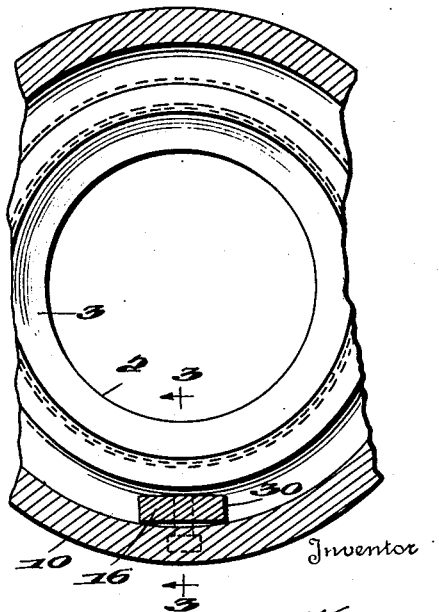
Inventor
M. F. Waters,
By Prevost & Prevost
Attorneys July 4, 1939.  M. F. WATERS  2,165,163
PIPE COUPLING
Filed April 25, 1938  3 Sheets-Sheet 3
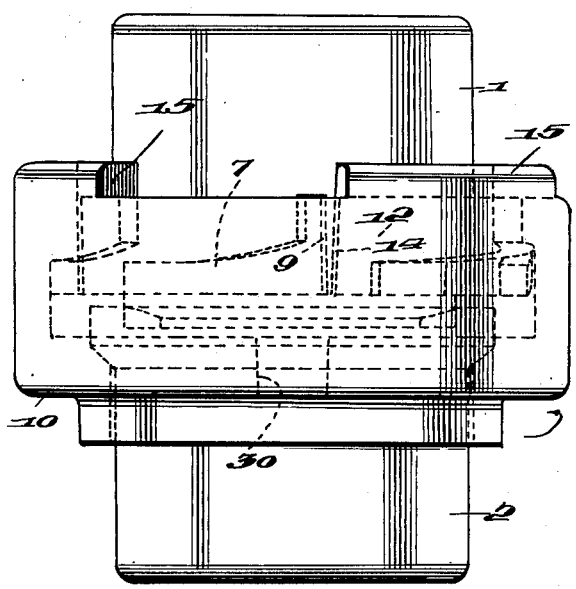
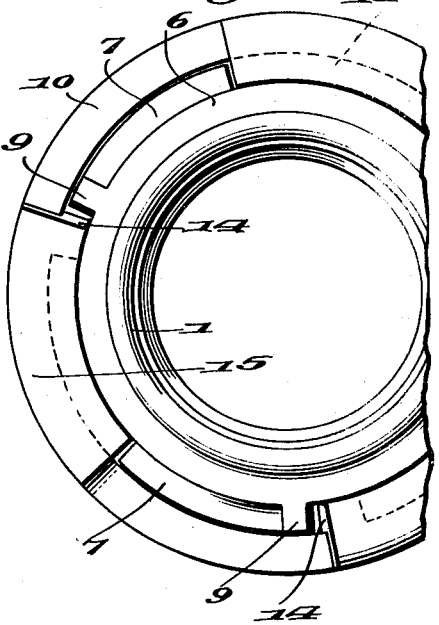
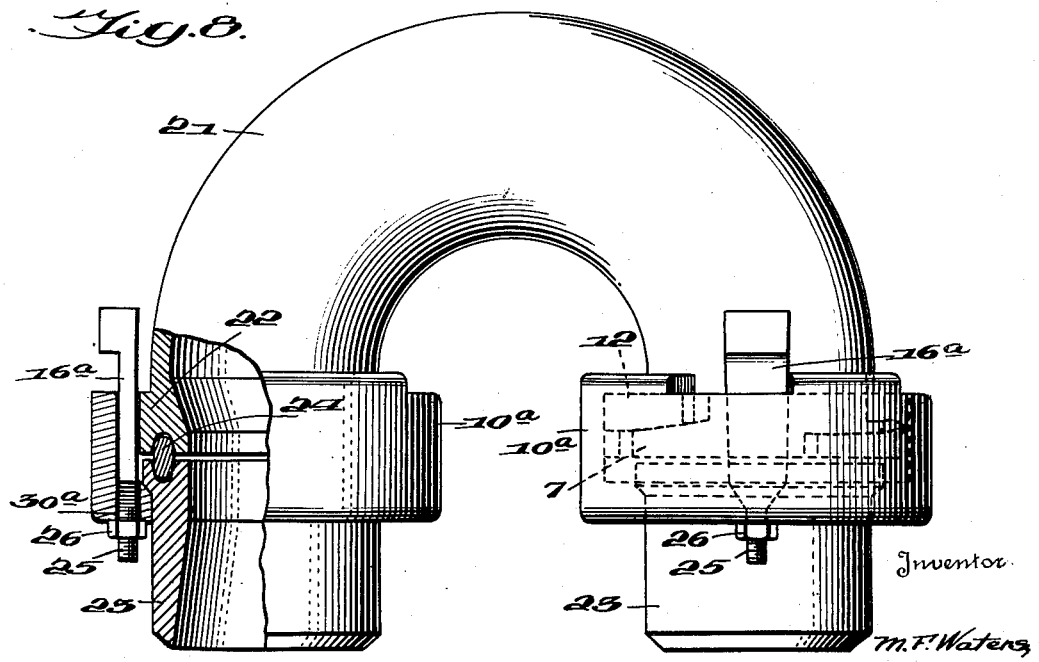

Patented July 4, 1939

2,165,163

UNITED STATES PATENT OFFICE 2,165,163

PIPE COUPLING

Millard F. Waters, Tulsa, Okla., assignor to Hanlon-Waters, Inc., Tulsa Okla.

Application April 25, 1938, Serial No. 204,153

3 Claims. (Cl. 285—175)

My invention consists in new and useful improvements in pipe couplings and has for its object to provide a device of this character whereby the union of two pipe sections may be effected without the use of bolts and nuts.

Another object of my invention is to provide a pipe coupling, the sections of which are so designed as to facilitate rapid assembly and disassembly thereof.

There have been numerous attempts to design pipe couplings in the past with a view to simplicity in construction and assembly such for example as the type employing a single bolt for drawing two complementary wedged sections together, but with this type of coupling as well as any other employing a bolt or bolts as the locking elements, it is not always convenient to have the locking device at the most available position on the coupling. That is, in many instances, when the coupling sections are screwed on to the adjacent pipe ends, it is found that access to the locking device is obstructed by another pipe or some piece of equipment. It is therefore a further object of my invention to provide a single locking device which may be applied at various positions on the coupling, thereby avoiding the disadvantage above noted.

Still another object of my invention is to provide a coupling which is devoid of projecting ears and anchoring abutments, and wherein the locking is effected by a wedge action entirely within the confines of the coupling.

A still further object of the present invention is to provide a pipe coupling employing two opposed series of wedging lugs which are forced into wedging engagement by a single wedge lock member and including means for positively guiding the latter within the confines of the coupling.

With the above and other objects in view which will appear as the description proceeds, my invention resides in the novel features hereinafter set forth, illustrated in the accompanying drawings, and more particularly pointed out in the appended claims.

Referring to the drawings in which numerals of like character designate similar parts throughout the several views, Fig. 1 is an exploded perspective view of one form of my improved coupling.

Fig. 2 is a view in side elevation showing the various elements of the coupling assembled and with the locking wedge in place.

Fig. 3 is a fragmentary sectional view taken on line 3—3 of Fig. 2.

Fig. 4 is a plan view of Fig. 2 with the locking wedge shown in section.

Fig. 5 is a sectional view taken on line 5—5 of Fig. 3.

Fig. 6 is a view similar to Fig. 2 but showing the parts in position prior to the insertion of the locking wedge.

Fig. 7 is a plan view of the parts shown in Fig. 6.

Fig. 8 is a view in side elevation, partly broken away, showing a modified adaptation of my invention, and Fig. 9 is a view in side elevation showing a plug member adapted to be used in connection with the invention.

In the drawings, 1 and 2 represent a pair of cylindrical nipples, each of which is provided with internal threads 1a and 2a, respectively, by means of which said nipples are attached to adjacent ends of sections of pipe to be coupled together. The nipple 2 is provided with an annular flange or ring 3 which is beveled as at 4 on its undersurface and recessed in its upper surface to receive a suitable gasket 5.

The lower end of the nipple 1 terminates in an enlarged ring 6, the outer periphery of which carries a series of projecting lugs 7 spaced at predetermined points. Each of the lugs 7 is provided with an inclined wedging shoulder 8 which extends in a circumferential direction, said lugs terminating at their flaring ends in elongated vertically inclined abutments 9 preferably of a length corresponding to the depth of the enlarged ring 6, all as clearly shown in Fig. 1.

The lower nipple 2 is adapted to extend through one end of a coupling collar 10 where it is retained in place by an annular shoulder 11, the latter being preferably beveled to correspond with the beveled lower face 4 of the flange 3 on the nipple 2. The diameter of the inner periphery of collar 10 is such that the upper nipple 1 with its peripheral lugs 7 may be slipped into the collar as hereinafter set forth.

Adjacent the upper edge of the collar 10, I provide a series of inwardly projecting lugs 12 each of which is provided with an inclined wedging shoulder 13 and terminating in an elongated vertically inclined abutment 14. It will be noted that the lugs 12 are extended above the normal upper edge of the collar 10 so as to form thickened projections 15 to facilitate the use of a hammer or like tool in applying and dismantling the coupling. The lugs 12 on the collar 10 are spaced to accommodate the lugs 7 on the nipple 1 and are in all respects oppositely disposed to the nipple lugs so as to act as complementary wedging members for both the wedging shoulders 8 and the abutments 9.

The elements of the coupling are assembled by dropping the lower nipple 2 into the collar 10 with the flange 3 engaging the shoulder 11, after which the gasket 5 is inserted in its recess in the upper end of the nipple 2. The nipple 1 is then inserted in the collar with the lugs 7 occupying positions between the lugs 12 on the collar as shown in Fig. 6, the lower edge of the nipple 1 resting upon the upper face of the gasket 5.

The collar is then turned to the right in Fig. 6 of the drawings so that the wedging shoulders 13 on the lugs 12 engage the corresponding wedging shoulders 8 on the nipple lugs 7. This separates the oppositely disposed abutments 9 and 14 on the nipple 1 and collar 10, respectively, as shown in Fig. 2 so that a tightening wedge or locking wedge 16 may be inserted between said abutments in the space between the ring 6 on the nipple 1 and the inner periphery of the collar 10. This locking wedge is preferably provided with a thickened upper end or head 17, whereby the same may be tapped with a hammer or the like to force the abutments 9 and 14 apart and exert an opposing wedging action upon the shoulders 8 and 13 of the peripheral lugs, to bring the adjacent nipples 1 and 2 into tight engagement at their abutting ends.

In the form shown in Figs. 1 to 5, the wedge 16 gradually tapers towards its lower end which extends through a guide slot 30 in the lower portion of the collar 10 and projects beyond the lower edge of said collar. This projecting end is provided with a threaded aperture 18 adapted to receive a set screw 19. The lower edge of the collar terminates in a short downwardly extending sleeve 20 which surrounds a portion of the lower nipple 2, whereby when the wedge 16 is in place, the set screw 19 may be inserted and screwed into abutment with the sleeve 20 to prevent dislodging of the wedge. The wedge may be removed by tapping the projecting lower extremity thereof with a hammer or the like, after which the reverse rotation of the collar 10 affects disengagement of the complementary lugs 7 and 12.

It will be noted that with this arrangement, the wedge 16 may be inserted between any of the opposed pairs of abutments 9 and 14 so that if it is not convenient to apply the wedge at one position on the coupling because of some obstruction, another more convenient location is available. While I have shown only three sets of lugs, it will be obvious that either more or less may be used if desired, and while I have shown an arrangement wherein the collar 10 is rotated in one particular direction for locking the elements together, I may, if desired, reverse the disposition of the wedging shoulders and abutments so that the elements may be locked by rotation of the collar in the opposite direction.

The elongation of the adjacent abutments 9 and 14 provides for a maximum of wedging surface for engagement by the wedge 16, and by arranging all of the wedging elements within the confines of the collar 10, there are no projecting ears and anchoring abutments. Furthermore, with this arrangement, the wedging force is applied in direct line with the wedging lugs, thus eliminating any torque and leverage strains. In other words, by applying the rotational force directly behind and across the entire vertical extent of the abutments of the wedging lugs, I assure a smoother operation of the coupling member and a more positive wedging action, which naturally results in a much tighter joint and more efficient coupling device.

Another advantage of the present coupling over somewhat similar couplings employing bolts or the like, lies in the fact that with a bolt-locked coupling where the bolt is under tension at all times, there is more or less elongation of the bolt by reason of expansion and contraction under high temperature conditions. When the bolt lengthens, it naturally reduces the pulling stress and there is a possibilty of a loosening of the coupling. On the other hand, with my improved wedge lock, this elongation or expansion is avoided, thus insuring a tight coupling at all times.

In Fig. 8 I have shown a slightly different type of coupling applied to a return bend such as used in tube stills, etc., where it is frequently necessary to open up the ends of the tubes for cleaning purposes. In this adaptation, a return bend 21 terminates at each end in a member 22 which is similar in most respects to the nipple 1 heretofore described, being provided with spaced wedging lugs 7. Adjacent each of the members 22 are opposed members 23 adapted to be welded to the ends of parallel still tubes. The opposite faces of the members 22 and 23 are recessed to receive a sealing ring or gasket 24 of a slightly different construction than the gasket 5. A coupling collar 10a encloses the adjacent ends of members 22 and 23 and is provided on its inner periphery with a series of wedging lugs 12 similar to those on the collar 10 above described, and adapted to cooperate with the wedging lugs 7 on the ends of the return bend in the same manner. In this instance, however, the collar is not provided with a downwardly extending sleeve or skirt 20 for the reason that a slightly different type of locking wedge 16a is employed. This wedge is reduced at its lower end 25 which extends through a guide opening 30a in the collar and is threaded to receive a nut 26 whereby the wedge may be tightened and locked in place by rotating the nut which abuts the lower edge of the opening 30a.

While I have shown a slightly different type of collar and wedge lock in connection with the return bend adaptation, it is to be understood that the two types are interchangeable. In other words, I may employ a collar and wedge lock of the type shown in Fig. 8 in connection with the coupling used for ordinary pipe coupling purposes such as those illustrated in Figs. 1 to 7, and vice versa.

In many instances, these types of couplings, particularly in large sizes, are used in drilling wells where it is desired to disconnect the line and plug it quickly. I have therefore devised a plug such as illustrated in Fig. 9 which operates on the same principle as the coupling just described. This plug consists of a body portion 27 provided with wedging lugs 7 and is adapted to be inserted into the collar 10 where said lugs cooperate with the wedging lugs 12, a wedge lock of the type shown at 16 or 16a being inserted between adjacent abutments of the lugs. To facilitate handling, the plug is preferably provided with projecting ears or handles 28 which also serve as means for initiating the turning of the plug and the removal thereof.

From the foregoing it is believed that the construction and advantages of my improved coupling may be readily understood by those skilled in the art without further description, it being borne in mind that numerous changes may be made in the details disclosed without departing from the spirit of my invention as set out in the following claims.

What I claim and desire to secure by Letters Patent is:

1. A pipe coupling including a pair of opposed members adapted for engagement in end to end relation, a coupling collar adapted to embrace said members, means on said collar for engaging one of said members, outwardly projecting wedging lugs on the periphery of the other of said members, oppositely disposed complementary wedging lugs on the inner periphery of said collar cooperating with said first named lugs upon the rotation of said collar, opposed inclined abutments on the flaring ends of the respective lugs, and a tightening wedge adapted to be interposed between adjacent opposed abutments for rotating said collar and effecting engagement of said lugs.

2. A pipe coupling including a pair of opposed members adapted for engagement in end to end relation, a coupling collar adapted to embrace said members, means on said collar for engaging one of said members, outwardly projecting wedging lugs on the periphery of the other of said members, oppositely disposed complementary wedging lugs on the inner periphery of said collar cooperating with said first named lugs upon the rotation of said collar, opposed vertically elongated inclined abutments extending beyond the flaring ends of the respective lugs within the confines of said collar, and a tightening wedge adapted to be interposed between adjacent opposed abutments for rotating said collar and effecting engagement of said lugs.

3. A pipe coupling including a pair of opposed members adapted for engagement in end to end relation, a coupling collar adapted to embrace said members, an internal shoulder on said collar for engaging one of said members, outwardly projecting wedging lugs on the periphery of the other of said members, oppositely disposed complementary wedging lugs on the inner periphery of said collar cooperating with said first named lugs upon the rotation of said collar, oppositely inclined abutments on the flaring ends of the respective lugs, a vertical guide opening in the shoulder of said collar adjacent the abutment of each collar lug, and a tightening wedge adapted to be inserted through one of said guide openings to lie between the inner periphery of said collar and said lugged member and between adjacent opposed abutments for rotating said collar and effecting engagement of said lugs, said wedge lock extending vertically beyond the upper and lower extremities of said collar.

MILLARD F. WATERS.